United States Patent
Nitsche et al.

(10) Patent No.: US 7,330,455 B2
(45) Date of Patent: Feb. 12, 2008

(54) METHOD AND COMMUNICATION DEVICE FOR EXPANDING THE RANGE OF DATA TRANSMISSION RATES IN WIRELESS LOCAL AREA NETWORKS

(75) Inventors: Gunnar Nitsche, Radebeul (DE); Matthias Hofmann, Freital (DE); Volker Aue, Dresden (DE)

(73) Assignee: Philips Semiconductors Dresden AG, Dresden (DE)

( * ) Notice: Subject to any disclaimer, the term of this patent is extended or adjusted under 35 U.S.C. 154(b) by 212 days.

(21) Appl. No.: 10/540,054

(22) PCT Filed: Dec. 19, 2003

(86) PCT No.: PCT/DE03/04218

§ 371 (c)(1),
(2), (4) Date: Jan. 25, 2006

(87) PCT Pub. No.: WO2004/062196

PCT Pub. Date: Jul. 22, 2004

(65) Prior Publication Data
US 2006/0133327 A1    Jun. 22, 2006

(30) Foreign Application Priority Data
Jan. 6, 2003    (DE) ................................ 103 00 366

(51) Int. Cl.
*H04Q 7/24* (2006.01)
(52) U.S. Cl. ..................... 370/338; 370/337; 370/343
(58) Field of Classification Search ................ 370/338, 370/337, 343, 345, 347, 326, 328
See application file for complete search history.

(56) References Cited

U.S. PATENT DOCUMENTS 6,466,591 B1 * 10/2002 See et al. ................... 370/535

(Continued)

FOREIGN PATENT DOCUMENTS

WO    02/17572    8/2001

OTHER PUBLICATIONS

"IEEE Standard for Information Technology—Telecommunications and Information Exchange Between Systems—Local and Metropolitan Area Networks—Specific Requirements. Part II: Wireless LAN Medium Access Control (MAC) and Physical Layer ({PHY) Specification" Aug. 20, 1999; Seiten; pp. 1, 34-58 ANSI/EEE Std. 802.11, 1999 Edition.
"Proposed Text for Extended Supported Rates Element" by Marcus Gahler, IEEE P802, Jan. 8, 2003, pp. 1-3.
Search Report dated Jun. 2004.

*Primary Examiner*—Lester G. Kincaid
*Assistant Examiner*—Fred Casca
(74) *Attorney, Agent, or Firm*—Baker Botts LLP; Manu J. Tejwani

(57) ABSTRACT

A communication device and a method for transmitting data in wireless local area networks is provided. The device and method are deployed in networks in which the data information elements include an element identification part, a length statement part and an information part. The device and method enable a broad range of data transmission rates and are full compatible with communicating units operating according to previous modes in which a first data transmission rule defines the acceptable range of values of element identification parts. In the method, a second data transmission rule is implemented in at least one of the communicating units to extend the acceptable range of values of element identifications. The range of values is extended so that a second standard portion of the element identification part marks the information element as a second information element.

18 Claims, 1 Drawing Sheet

U.S. PATENT DOCUMENTS

| | | | |
|---|---|---|---|
| 6,522,635 B1 * | 2/2003 | Bedwell | 370/314 |
| 6,831,901 B2 * | 12/2004 | Millar | 370/315 |
| 6,934,551 B1 * | 8/2005 | Kuriyan | 455/466 |
| 6,996,079 B1 * | 2/2006 | Bergenwall et al. | 370/331 |
| 2003/0134590 A1 * | 7/2003 | Suda et al. | 455/3.06 |
| 2004/0258091 A1 * | 12/2004 | Meyer et al. | 370/469 |

* cited by examiner

METHOD AND COMMUNICATION DEVICE FOR EXPANDING THE RANGE OF DATA TRANSMISSION RATES IN WIRELESS LOCAL AREA NETWORKS

CROSS REFERENCE TO RELATED APPLICATIONS

This application claims the benefit of International Patent Application No. PCT/DE2003/004218 filed Dec. 19, 2003, which claims priority to German Patent Application No. 103 00 366.5 filed Jan. 6, 2003, both of which applications are hereby incorporated by reference in their entireties herein.

FIELD OF THE INVENTION

The invention relates to methods for data transmission in wireless local area networks. The invention, in particular, relates to methods for increasing data transmission rates between communication units which may be operating in diverse modes.

BACKGROUND OF THE INVENTION

Data transfer in wireless local area networks between a first and second communicant may involve a first standardized data transmission rule or format and transmission and/or reception on electromagnetic signal paths of information elements with variant element formats. The information elements in this case may include an element identification part, a length statement part and an information part. The element identification part has a permissible value range from which a first standardized value of the element identification part identifies the information element as a first information element. The information part of the first information element contains parameters which relate to the data transmission of the communicant in accordance with a first data transmission rule as the transmitter. A receiving communicant stores the parameters which relate to the transmitting communicant in order to set the data transmission in the reply to the transmitting communicant. On identification of a value of the element identification part outside the permissible value range, each of the communicants, as the receiver determines the length of the information part from the length statement part, and jumps over the information part corresponding to the determined length.

A communication device for data transmission in wireless networks may be connected as the first communicant in such networks to a second communicant via electromagnetic signal paths. The communication device has at least one transmitting unit. In this case, a first data transmission rule (which defines first information elements comprising an element identification part, a length statement part and an information part) is implemented in the communication device and defines a permissible value range for the element identification part.

The importance of wireless networks has increased continuously in recent years. Their usage capabilities appear to be unlimited. The simplest option is to use two or more hosts (communicants) with wireless network cards in a so-called ad-hoc network.

If it is intended to connect the wireless network (WLAN) to a wire-based local area network (LAN), an access point (AP) is required. A network structure such as this is also referred to as a distribution system (DS).

An access point (first communicant) forms a radio cell with at least one individual station (second communicant).

The increase in coverage is achieved by additional cells with two or more access points. Each access point acts like a traditional network bridge.

One problem which has prevented wider use of WLANs was the inadequate standardization for a long time. This situation has now changed with an increasing tempo since the Institution of Electrical and Electronics Engineering (IEEE) has adopted WLAN Standards in recent years. See e.g., Publication XP002206839, IEEE standard for information technology telecommunication and information exchange between systems—local and metropolitan area networks—specific requirement, Part II: wireless LAN medium access control (MAC) and physical layer (PHY) specification, (ISO/IEC 8802-11, ANSI/IEEE Std. 802.11-1999), 20 Aug. 1999.

One such disadvantage was also that wireless networks did not allow such high data transmission rates as wire-based networks.

This was because the bandwidths provided by the regulators are limited and wireless networks have to introduce additional security mechanisms and expanded information in the data packets in order to make it possible to take account of the characteristic of a radio link.

Since radio links are more susceptible to interference than cables, additional correction mechanisms have been introduced in the MAC layer in Standard 802.11.

In the event of data transmission errors, these correction mechanisms ensure that the data packets are sent again, without any involvement of higher protocol layers in this process. This may now possibly lead to lengthened data transmission times in comparison to the quite error-free connection in a cable-based network.

The IEEE Committee continued the further development of the already established WLAN Standard 802.11 by supplementing 802.11a for 5 Ghz and 802.11b for 2.4 Ghz.

At the moment, a further increase in the data rate in the 2.4 Ghz band is being worked on in the IEEE 802.11g working group. One important feature of the new standard is the backwards compatibility with the established IEEE 802.11b Standard.

The provider companies found out quite quickly that lack of compatibility detracts from the acceptance of their products for wireless local area network technology.

In order to allow matching to different radio channels, the 802.11 Standard and its extensions 802.11a and b allow various data transmission rates. The data rates are coded in an information element which, in accordance with IEEE 802.11, allows a maximum number of 8 rates and is transmitted in the beacon signal.

The IEEE 802.11g Standard provides for more than 8 data rates to be allowed. Intraoperability tests have shown that, when more than 8 data rates are notified in the conventional information element, backwards compatibility with existing solutions is no longer guaranteed.

Consideration is now being given to improving communication devices and network data transmission methods. In particular attention is directed to communication devices and data transmission methods which can achieve a wide range of data transmission rates while remaining fully compatible with communicants operating in diverse modes including legacy modes.

SUMMARY OF THE INVENTION

Communication devices and data transmission methods are provided for networked communications with diverse communicants. The data transmission methods may be implemented to achieve a wide range of data transmission rates which are fully compatible with the various operating modes of the diverse communicants.

In an inventive data transmission method, at least in the case of one of the communicants, the first and a second data transmission rule are implemented, and the permissible value range is expanded in such a way that a second standardized value of the element identification part identifies the information element as a second information element whose information part contains parameters which relate to the data transmission of the transmitting communicant in accordance with the second data transmission rule. This makes it possible, in addition to the parameters for data transmission in accordance with the first data transmission rule, to also transmit parameters for data transmission in accordance with the second data transmission rule from the transmitting communicant to the receiving communicant. The second data transmission rule therefore allows a wider range of parameters than the first, for example. Parameters which relate to the second data transmission rule can thus be used alternatively or in addition to the parameters which relate to the first data transmission rules.

The parameters which relate to the first and the second data transmission rules are expediently clearly separated in that the first information element contains only parameters which relate to the data transmission in accordance with the first data transmission rule, and the second information element contains only parameters which relate to the data transmission in accordance with the second data transmission rule.

In conjunction with the fact that information elements whose element identification does not correspond to the range of values are jumped over by each communicant, the method is also backwards-compatible. The second information element is advantageously jumped over on reception of the second information element by a communicant in which only the first data transmission rule is implemented. If second information elements are sent in this case to communicants in which only the first data transmission rule is implemented, then the element identification of the second information element is outside the permissible value range, and the second information element is jumped over by the receiving communicant, and therefore does not cause any disturbance.

The advantage of the greater variation of parameters which relate to data transmission is achieved in particular in that when a communicant in which both data transmission rules are implemented receives the second information element, the parameters which relate to the first and second information elements are stored.

The method is advantageously carried out in such a way that the values in the information part of second information elements represent a set of data transmission rates which are supported by the transmitting communicant, in such a way that each value corresponds to one supported data transmission rate. A transmitting communicant thus informs the receiving communicant about all of the data transmission rates which it can process. The receiving communicant can then select a suitable data transmission rate in the acknowledgement.

A refinement of the method according to the invention provides that the difference between a data transmission rate which corresponds to one value and the data transmission rate which corresponds to the next value is greater than or equal to 500 Kbit/s. A wide variation range of data transmission rates is thus available.

In this case, it is particularly expedient for the difference to be 1 Mbit/s.

A further refinement in the method provides that at most eight values correspond to the data transmission rates of the first data transmission rule, and all the other values correspond to the data transmission rates of the second data transmission rule. This corresponds to older standard requirements in which at most eight values were provided for the variation of the data transmission rates.

For this purpose, it is also possible for the second information element additionally to contain values for data transmission rates which are equal to values for data transmission rates of the first data transmission rule.

In this case, it is possible that when a communicant in which both data transmission rules are implemented receives the second information element, only the parameters which relate to the second information element are stored.

The method according to the invention can also be expanded in a manner which corresponds to the first and second information elements in that, in addition to the second information element, a third or further information element or elements is or are also formed, which represents or represent third or further data transmission rules.

One refinement of the method according to the invention provides that the data transmission rates are coded with the aid of value pairs instead of single values. In this case, the one value of the pair codes the data transmission rule itself and the other value codes the data rate. In this case, it is particularly expedient to make the coding of the data rate dependent on the data transmission rule. This allows very flexible extension for new data transmission rules.

The object is also achieved by a communication device in which a second data transmission rule with an expanded value range of the element identification part is implemented. The transmitting unit can send two information elements which are defined by a second standardized value of the element identification part. In this case, its information part contains parameters which relate to the data transmission in accordance with the second data transmission rule.

When the second communicant is unknown, this communication device makes it possible, for example, first of all to attempt to send information elements in accordance with the second data transmission rule. In this case, an element identification part is provided with the standardized value. At the receiver end, it is thus possible to identify a transmitter which can operate in accordance with the second data transmission rule. If the second communicant can likewise operate using the second data transmission rule, it can be set to the appropriate operating mode. If it can operate only in accordance with the first data transmission rule, it will not be able to "understand" the standardized value, since this is outside the permissible value range. This receiver will therefore jump over the information element. A communication device designed in this way does not interfere with second communicants which are implemented as communication devices in which only the first data transmission rule is implemented.

In one embodiment of the invention, a receiving unit which is designed for reception of a first and of a second information element is arranged in the communication device. The communication device according to the invention is thus suitable not only for transmission but also for reception of information both in accordance with the first and the second data transmission rule.

A further embodiment of the communication device according to the invention can be switched between first and second data transmission rules as a function of the reception of information elements during transmission. The communication device is thus both backwards and forwards compatible. Specifically, if information is received in accordance with the first data transmission rule, the communication device can switch to operate with the first data transmission rule, and both communicants then continue their communication on the basis of the first data transmission rule.

If the communication device receives information with the second data transmission rule—for example by means of an identically designed communication device as the communicant at the other end, it will switch to operate in accordance with the second data transmission rule.

The communication device according to the invention is advantageously provided with a memory which is designed to store parameters of received second information elements. By way of example, the communication can thus be started straight away in accordance with the second data transmission rule at a later time, when this is stored, since the second data transmission rule was already relevant in a previous communication, and it can be assumed that the same communicant is still located in the vicinity. This therefore makes it possible initially to avoid the time for matching to the data transmission rule.

One development provides for a memory to be arranged, which is designed to store parameters of the received first and second information elements. In consequence, the same method as that described above can also be used for the first data transmission rule.

It is particularly advantageous to develop the communication device in such a way that a third or further data transmission rule or rules is or are implemented in the same way as the second data transmission rule. This also makes it possible to widen the backwards and forwards compatibility for other data transmission rules.

BRIEF DESCRIPTION OF THE DRAWINGS

Further features of the invention, its nature, and various advantages will be more apparent from the following detailed description and the accompanying drawings, wherein like reference characters represent like elements throughout, and in which.

Figure 1:
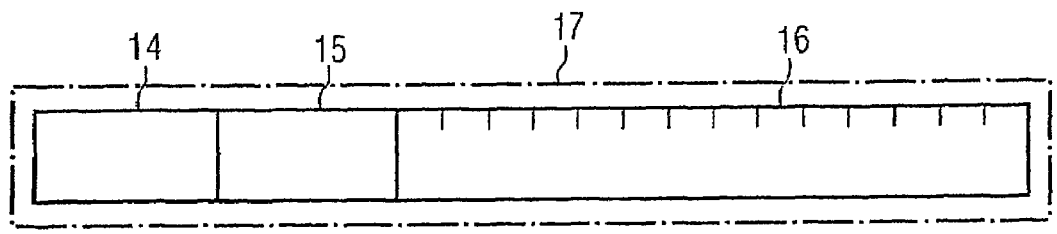
FIG. 1 is a schematic representation of an exemplary an information element design, in accordance with the principles of the present invention.
Figure 2:
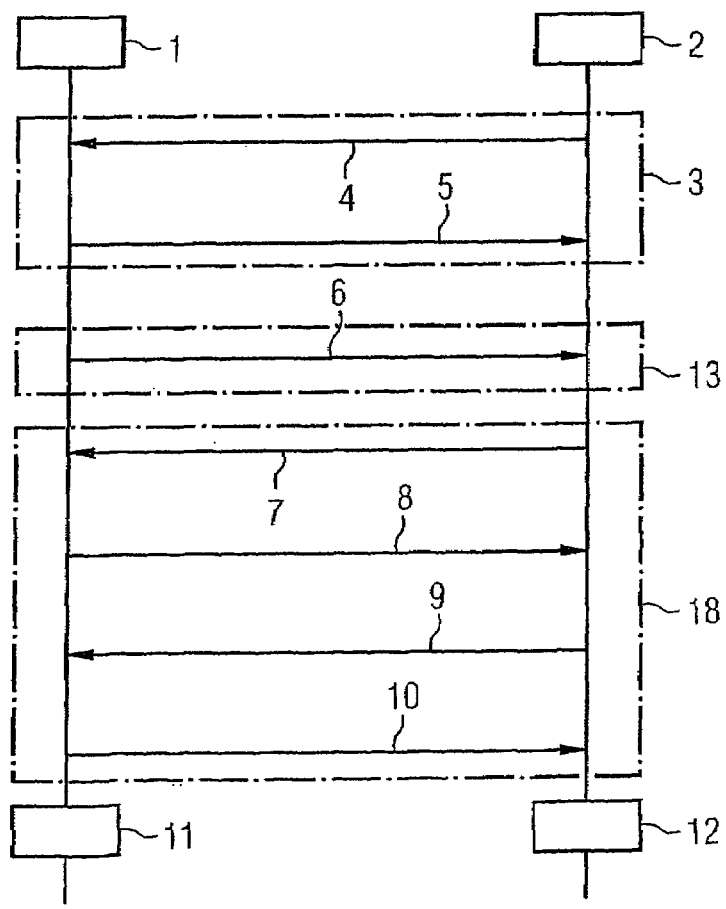
FIG. 2 is a block diagram of the data transmission processes in a wireless local area network, in accordance with the principles of the present invention.

The following list is an index of the reference characters or numerals that are used in FIGS. 1 and 2 to identify drawing elements.

LIST OF REFERENCE SYMBOLS

1. ERP Access point
2. Station
3. Data transmission test procedure
4. Test requirement
5. Test response
6. Radio beacon signal for the ERP access point
7. First authentication
8. Second authentication
9. Request for association
10. Association response
11. State of the successful association of the ERP access point
12. State of the successful association of the ERP station
13. Radio beacon signal transmission process
14. Element identification part
15. Length statement part
16. Information part
17. Information elements
18. Association process
19. Extended supported rates ID
20. Extended supported rates field

DETAILED DESCRIPTION OF EMBODIMENTS OF THE INVENTION

Communication devices and data transmission methods are provided for achieving high data transmission rates between heterogeneous communicants. An exemplary implementation of the invention is described herein with reference to a "critical case" according to the prior art of successful data transmission between an ERP access point 1 and a station 2 which is designed according to the prior art.

FIG. 1 shows a basic configuration of an information element 17. The information element 17 comprises the element identification part 14, the length statement part 15, and the information part 16. The information element 17 therefore contains all the important data in order to implement the data transmission rule.

FIG. 2 shows three possible options for data rate communication for the data transmission processes:

data transmission test procedure 3 radio beacon signal transmission process 13 association process 18

An access point which operates on the basis of the second data transmission rule is referred to in the following text as an ERP access point (Extended Rate Phy access point 1).

The data rate communication takes place between the ERP access point 1 and a station 2, which has the known data transmission rules according to the prior art.

In the data transmission test procedure 3, the station 2 uses a test request 4 which contains the element identification part 14 to request the ERP access point 1 for identification.

Since the ERP access point 1 has the data transmission rules according to the invention, it can respond with the test response 5 with the correct element identification part 14 which can be understood by the station 2, and can signal its information element 17.

In the radio beacon signal transmission process 13, the ERP access point 1 transmits its radio beacon signal 6 at regular intervals, which signals to all of the stations in the radio cell the information element 17 according to the first data transmission rule and according to the second data transmission rule. The station 2 stores the information element according to the first data transmission rule, and ignores the information element according to the second data transmission rule.

During the association process 18, the station 2 initiates a first authentication 7, which requests the ERP access point 1 to respond with a second authentication 8. Since the ERP access point 1 has the data transmission rules according to the invention, the communication from the station 2 can be continued with the request for association 9, and the ERP access point 1 responds with the association response 10. Both stations then assume the respective state of the successful association 11; 12.

It will be understood that the foregoing is only illustrative of the principles of the invention, and that various modifications can be made by those skilled in the art without departing from the scope and spirit of the invention.

We claim:

1. A method for data transmission in wireless local area networks between a first and a second transmitting and receiving communicant comprising:
   implementing a first standardized data transmission rule requiring transmission and/or reception of information elements with variant element formats on electromagnetic signal paths between the transmitting and receiving communicants,
   wherein each information element comprises an element identification part, a length statement part and an information part, the element identification part having a permissible value range in which a first standardized value of the element identification part identifies the information element as a first information element whose information part contains parameters which relate to the data transmission of the transmitting communicant in accordance with a first data transmission rule;
   storing by the receiving communicant parameters for the transmitting communicant in order to set the data transmission for return to the transmitting communicant;
   each of the communicants as the receiver, determining the length of the information part from the length statement part on identification of a value of the element identification part outside the permissible value range, and jumping over the information part corresponding to the determined length; and
   at least in the case of one of the communicants, implementing in addition to the first data transmission rule a second data transmission rule expanding the permissible value range so that a second standardized value of the element identification part identifies the information element as a second information element whose information part contains parameters which relate to the data transmission of the transmitting communicant in accordance with the second data transmission rule.

2. The method as claimed in claim 1, characterized in that the first information element contains only parameters which relate to the data transmission in accordance with the first data transmission rule, and the second information element contains only parameters which relate to the data transmission in accordance with the second data transmission rule.

3. The method of claim 1 further comprising the step of jumping over the second information element when a communicant in which only the first data transmission rule is implemented receives the second information element.

4. The method of claim 1 further comprising the step of storing the parameters which relate to the first and second information elements when a communicant in which both data transmission rules are implemented receives the second information element.

5. The method of claim 1 wherein the values in the information part of second information elements represent a set of data transmission rates which are supported by the transmitting communicant in such a way that each value corresponds to one supported data transmission rate.

6. The method of claim 5 wherein the difference between a data transmission rate which corresponds to one value and the data transmission rate which corresponds to the next value is greater than or equal to 500 Kbit/s.

7. The method of claim 6 wherein the difference is 1 Mbit/s.

8. The method of claim 5 wherein at most eight values correspond to the data transmission rates of the first data transmission rule, and all other values correspond to the data transmission rates of the second data transmission rule.

9. The method of claim 5 wherein the second information element additionally contains the values of the data transmission rates which are equal to values for data transmission rates of the first data transmission rule.

10. The method of claim 9 further comprising the step of storing only the parameters which relate to the second information element when a communicant in which both data transmission rules are implemented receives the second information element.

11. The method of claim 5, further comprising the step of:
    in addition to the second information element, forming a third or further information element or elements which represents or represent third or further data transmission rules, respectively.

12. The method of claim 5 wherein the data rates in the information element are represented by value pairs, wherein one value codes the data transmission rule itself and the other value codes the data rate, and wherein the coding of the data rate depends on the data transmission rule.

13. A communication device for data transmission in wireless networks, the communication device configured to connect as a first communicant to a second communicant via electromagnetic signal paths, comprising:
    at least one transmitting unit,
    wherein a first data transmission rule defines a first information element comprising an element identification part, a length statement part and an information part,
    wherein the first data transmission rule defines a permissible value range for the element identification part; an implementation in addition to the first data transmission rule of a second data transmission rule which expands the permissible value range of the element identification part, so that a second standardized value of the element identification part identifies the information element as a second information element whose information part contains parameters which relate to the data transmission of the transmitting communicant in accordance with the second data transmission rule,
    wherein the at least one transmitting unit is configured to send second information elements which are defined by a second standardized value of the element identification part, and whose information part contains parameters which relate to the data transmission in accordance with the second data transmission rule.

14. The communication device of claim 13, further comprising a receiving unit configured for reception of a first and of a second information element.

15. The communication device of claim 13 which is configured to switch between the first and second data transmission rules in response to the reception of information elements during transmission.

16. The communication device of claim 13, further comprising a memory which is arranged to store parameters which relate to received second information elements.

17. The communication device of claim 13, further comprising a memory which is arranged to store parameters which relate to received first and second information elements.

18. The communication device of claim 13, further comprising an implementation of at least a third data transmission rule which is similar to the implementation of the second data transmission rule.

* * * * *